United States Patent
Itkin

(10) Patent No.: US 10,303,635 B2
(45) Date of Patent: May 28, 2019

(54) REMOTE HOST MANAGEMENT USING SOCKET-DIRECT NETWORK INTERFACE CONTROLLERS

(71) Applicant: Mellanox Technologies, Ltd., Yokneam (IL)

(72) Inventor: Yuval Itkin, Zoran (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/701,461

(22) Filed: Sep. 12, 2017

(65) Prior Publication Data

US 2019/0079887 A1    Mar. 14, 2019

(51) Int. Cl.
*G06F 13/38* (2006.01)
*H04L 29/06* (2006.01)
*G06F 11/20* (2006.01)

(52) U.S. Cl.
CPC .......... *G06F 13/385* (2013.01); *H04L 69/162* (2013.01); *H04L 69/163* (2013.01); *G06F 11/2005* (2013.01)

(58) Field of Classification Search
CPC .. G06F 13/385; G06F 11/2005; H04L 69/162; H04L 69/163
See application file for complete search history.

(56) References Cited

U.S. PATENT DOCUMENTS

2003/0233450 A1* 12/2003 Carley ................ H04L 41/0246
                                                         709/224
2005/0216715 A1   9/2005 Matheny et al.
2013/0086371 A1   4/2013 Bisht et al.
2015/0172112 A1   6/2015 Itkin et al.
2015/0215343 A1*  7/2015 Itkin ...................... H04L 41/04
                                                         709/217

(Continued)

OTHER PUBLICATIONS

PCI Express® Base Specification, Revision 3.1, 1073 pages, Mar. 2014.

(Continued)

*Primary Examiner* — Hyun Nam
*Assistant Examiner* — John B Roche
(74) *Attorney, Agent, or Firm* — Kligler & Associates

(57) ABSTRACT

A network adapter includes one or more network ports, multiple bus interfaces, and a processor. The one or more network ports are configured to communicate with a communication network. The multiple bus interfaces are configured to communicate with multiple respective Central Processing Units (CPUs) that support a management protocol and belong to a multi-CPU device, and with a Baseboard Management Controller (BMC). The processor is configured to, in response to a request to enumerate the bus interfaces that support the management protocol, report support of the management protocol over only a single bus interface, selected from among the multiple bus interfaces connecting the network adapter to the multi-CPU device, and exchange management packets over the communication network between the BMC and a remote management computer, wherein the management packets manage the entire multi-CPU device but traverse only the single selected bus interface.

11 Claims, 2 Drawing Sheets

(56) References Cited

U.S. PATENT DOCUMENTS

| 2016/0127197 | A1* | 5/2016 | Yethadka | H04L 41/12 |
| | | | | 709/224 |
| 2016/0248619 | A1 | 8/2016 | Itkin | |
| 2016/0248620 | A1 | 8/2016 | Itkin | |

OTHER PUBLICATIONS

DMTF—"Management Component Transport Protocol (MCTP) Base Specification", DMTF Document DSP0236, version 1.3.0, 94 pages, Nov. 24, 2016.
DMTF—"Management Component Transport Protocol (MCTP) PCIe VDM 25 Transport Binding Specification," DMTF Document DSP0238, version 1.0.1, 19 pages, Dec. 11, 2009.
DMTF—"NC-SI over MCTP Binding Specification", DMTF Document DSP0261, version 1.1.0, 31 pages, Mar. 21, 2015.
DMTF—"Management Component Transport Protocol (MCTP) SMBus/I2C Transport Binding Specification", DMTF Document DSP0237, version 1.0.0., 42 pages, Jul. 28, 2009.
DMTF—"Server Management Command Line Protocol (SM CLP) Specification", DMTF Document DSP0214, version 1.0.2, 164 pages, Mar. 7, 2007.
Intel Corporation., "Preboot Execution Environment (PXE) Specification", version 2.1, 103 pages, Sep. 20, 1999.
Unified Extensible Firmware Interface Specification, version 2.6, Chapter 3 (pp. 69-92), Jan. 2006.
Unified Extensible Firmware Interface Specification, version 2.6, Chapter 6 (pp. 127-232), Jan. 2006.
Unified Extensible Firmware Interface Specification, version 2.6, Chapter 10 (pp. 367-454), Jan. 2006.
Unified Extensible Firmware Interface Specification, version 2.6, Chapter 13 (pp. 687-788), Jan. 2006.
U.S. Appl. No. 15/717,969 office action dated Sep. 20, 2018.

\* cited by examiner

REMOTE HOST MANAGEMENT USING SOCKET-DIRECT NETWORK INTERFACE CONTROLLERS

FIELD OF THE INVENTION

The present invention relates generally to network communication, and particularly to methods and systems for remote host management.

BACKGROUND OF THE INVENTION

The Peripheral Component Interconnect Express (PCIe) protocol is a high-speed expansion bus protocol that is commonly used for interconnecting computer components. PCIe is specified, for example, by the PCI Special Interest Group (PCI-SIG), in "PCI Express Base Specification Revision 3.1a," Dec. 7, 2015, which is incorporated herein by reference.

The Management Component Transport Protocol (MCTP) is a management protocol that provides various monitoring and control functions in a managed computer system. MCTP may be applied, for example, over PCIe. MCTP is specified, for example, by the Distributed Management Task Force (DMTF), in "Management Component Transport Protocol (MCTP) Base Specification," Document DSP0236, version 1.3.0, Nov. 24, 2011, which is incorporated herein by reference.

MCTP over PCIe is specified, for example, in "Management Component Transport Protocol (MCTP) PCIe VDM Transport Binding Specification," DMTF Document DSP0238, version 1.0.1, Dec. 11, 2009, which is incorporated herein by reference. Network Controller Sideband Interface (NC-SI) over MCTP is specified, for example, in "NC-SI over MCTP Binding Specification," DMTF Document DSP0261, version 1.1.0, Mar. 21, 2015, which is incorporated herein by reference.

SUMMARY OF THE INVENTION

An embodiment of the present invention that is described herein provides a network adapter including one or more network ports, multiple bus interfaces, and a processor. The one or more network ports are configured to communicate with a communication network. The multiple bus interfaces are configured to communicate with multiple respective Central Processing Units (CPUs) that support a management protocol and belong to a multi-CPU device, and with a Baseboard Management Controller (BMC). The processor is configured to, in response to a request to enumerate the bus interfaces that support the management protocol, report support of the management protocol over only a single bus interface, selected from among the multiple bus interfaces connecting the network adapter to the multi-CPU device, and exchange management packets over the communication network between the BMC and a remote management computer. The management packets manage the entire multi-CPU device but traverse only the single selected bus interface.

In some embodiments, the processor is configured to refrain from reporting the support of the management protocol on one or more of the bus interfaces in response to the request, even though the one or more of the bus interfaces support the management protocol. In an embodiment, by reporting the support of the management protocol on only the single bus interface, the processor is configured to cause the BMC and the remote management computer to view the network adapter as a single managed entity of the management protocol on that bus interface.

In a disclosed embodiment, the multiple bus interfaces are configured to communicate with the multi-CPU device over a Peripheral Component Interconnect Express (PCIe) bus. In an example embodiment, the management protocol includes a Management Component Transport Protocol (MCTP). In an embodiment, the multi-CPU device includes a multi-CPU server.

There is additionally provided, in accordance with an embodiment of the present invention, a method for remote management including, in a network adapter, communicating with a communication network via one or more ports, communicating with a BMC, and communicating via multiple bus interfaces with multiple respective Central Processing Units (CPUs) that support a management protocol and belong to a multi-CPU device. In response to receiving in the network adapter a request to enumerate the bus interfaces that support the management protocol, support of the management protocol is reported over only a single bus interface, selected from among the multiple bus interfaces connecting the network adapter to the multi-CPU device. Management packets are exchanged over the communication network between the BMC and a remote management computer. The management packets manage the entire multi-CPU device but traverse only the single selected bus interface.

There is further provided, in accordance with an embodiment of the present invention, a computer software product, the product including a tangible non-transitory computer-readable medium in which program instructions are stored, which instructions, when read by a processor of a network adapter, cause the processor to communicate with a communication network via one or more ports, to communicate with a BMC, to communicate via multiple bus interfaces with multiple respective Central Processing Units (CPUs) that support a management protocol and belong to a multi-CPU device, to report, in response to receiving a request to enumerate the bus interfaces that support the management protocol, support of the management protocol over only a single bus interface, selected from among the multiple bus interfaces connecting the network adapter to the multi-CPU device, and to exchange management packets over the communication network between the BMC and a remote management computer. The management packets manage the entire multi-CPU device but traverse only the single selected bus interface.

The present invention will be more fully understood from the following detailed description of the embodiments thereof, taken together with the drawings in which:

DETAILED DESCRIPTION OF EMBODIMENTS

Overview

Figure 1:
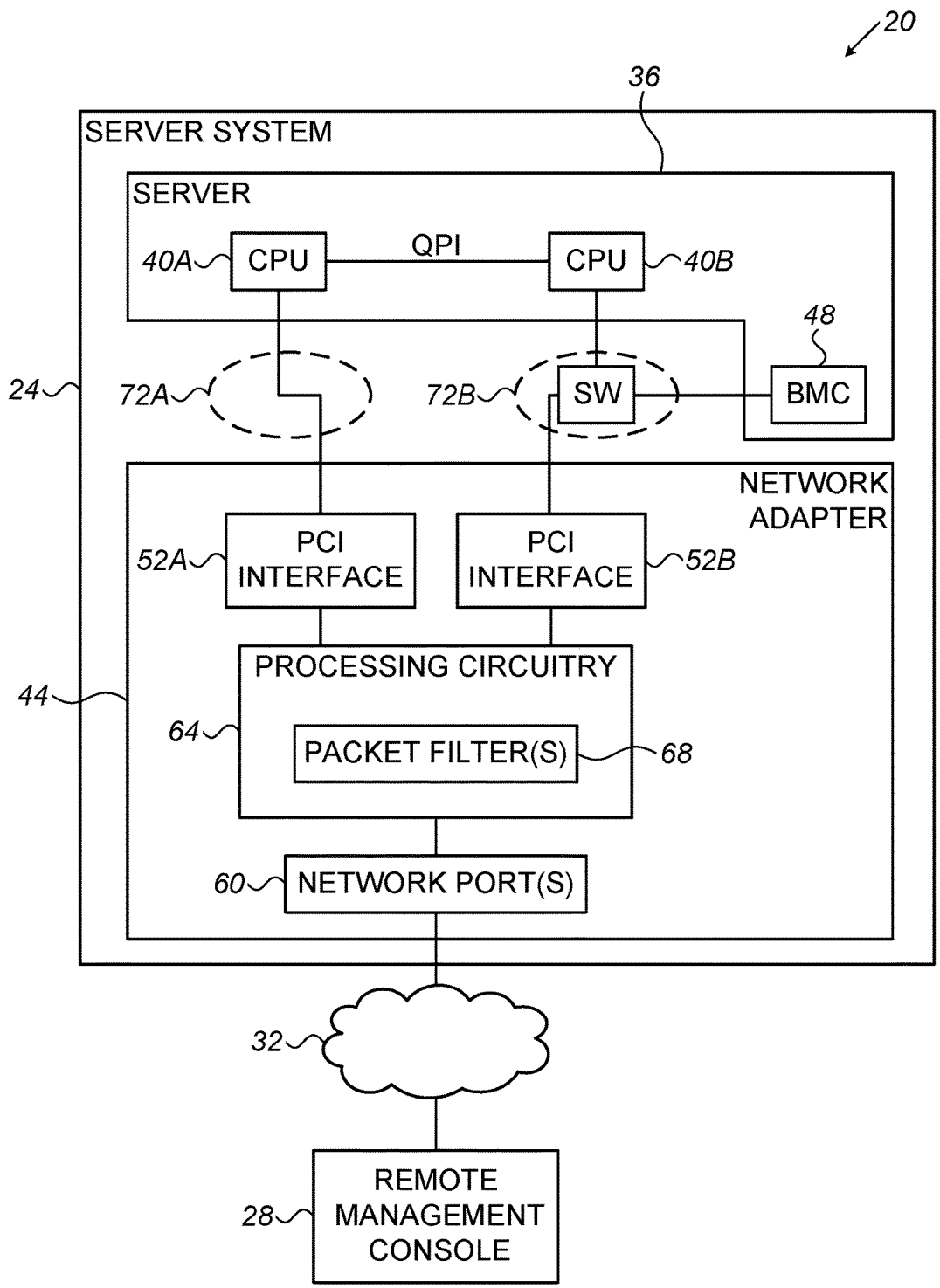
FIG. 1 is a block diagram that schematically illustrates a computing system comprising a remotely-managed multi-CPU server, in accordance with an embodiment of the present invention.

Embodiments of the present invention that are described herein provide improved methods and systems for remote management of multi-CPU devices. In an example embodiment, the disclosed techniques are used for remotely managing "Socket-Direct" multi-CPU servers over a network by a remote management console. Such a solution can be used, for example, in data centers or High-Performance Computing (HPC) computer clusters.

In some embodiments, a network adapter is used for connecting a multi-CPU server to a communication network. In particular, the network adapter is configured to communicate with two or more of the CPUs of the server directly, e.g., over direct respective PCIe links. Each of the CPUs in this configuration supports a management protocol such as MCTP, allowing, for example, MCTP transport to be used between a Baseboard Management Controller (BMC) and other elements connected on its PCIe bus, independently of other CPUs. The network adapter also communicates with a local BMC. The network adapter is thus configured to exchange (i) communication traffic between the CPUs and the network, and (ii) management packets between the BMC and the remote management console over the network.

The capability to communicate directly between the network adapter and multiple individual CPUs is advantageous with regards to communication performance. For remote management, however, this capability can be problematic, e.g., lead to modeling and configuration problems.

Consider, for example, a configuration in which each CPU of the multi-CPU server is an MCTP-over-PCIe-capable device, i.e., supports the MCTP-over-PCIe management protocol. A certain processor, e.g., one of the CPUs, is designated to serve as an "MCTP bus owner." The MCTP bus owner is configured to enumerate the MCTP-over-PCIe-capable devices of the multi-CPU server, e.g., on power-up of the PCIe interfaces. The network adapter, being an MCTP-over-PCIe-capable device itself, is expected to notify the MCTP bus owner of its support of the MCTP-over-PCIe management protocol. Since the network adapter is connected to multiple CPUs over multiple respective PCIe interfaces, it is conventionally expected to respond to the MCTP bus owner separately over each PCIe interface. As a result, the BMC and the remote management console would view the network adapter as multiple managed entities. This view may lead to management problems and should be avoided.

In some embodiments of the present invention, the network adapter deliberately refrains from exposing multiple PCIe interfaces supporting MCTP-over-PCIe to the MCTP bus owner. Instead, the network adapter reports to the bus owner only a single PCIe interface (selected from among the multiple PCIe interfaces connecting the network adapter to the multi-CPU server) as capable of supporting MCTP-over-PCIe. Consequently, the MCTP bus owner provides only a single MCTP-over-PCIe connection from the network adapter to the BMC. The BMC (and also the remote management console) will therefore regard and manage the network adapter (and also the entire multi-CPU server) as a single managed entity.

System Description

FIG. 1 is a block diagram that schematically illustrates a computing system 20, in accordance with an embodiment of the present invention. System 20 comprises a server system 24 and a remote management console 28. Console 28 manages server system 24 remotely, over a communication network 32.

System 20 may comprise, for example, a data center, a High-Performance Computing (HPC) computer cluster, or any other suitable type of computing systems in which remote host management is applicable. Network 32 may comprise, for example, a Local-Area Network (LAN), a Wide-Area Network (WAN) such as the Internet, or any suitable type of network or combination of networks. Network 32, server system 24 and console 28 may operate in accordance with any suitable network protocol, such as Infiniband or Ethernet.

The example of FIG. 1 shows a single server system 24 for the sake of clarity. Real-life systems may comprise multiple server systems 24. Remote management console 28 is also referred to as a remote management computer, for clarity.

In the embodiment of FIG. 1, server system 24 comprises a multi-CPU server 36 and a network adapter 44. Server 36 comprises a Baseboard Management Controller (BMC) 48. Multi-CPU server 36 comprises multiple Central Processing Units (CPUs) 40. The figure shows two CPUs 40 for the sake of clarity, but in various embodiments multi-CPU server 36 may comprise any suitable number of CPUs 40.

In the present example, multi-CPU server 36 is implemented as a "Socket-Direct" devices. In such a device, network adapter 44 is connected directly to two or more individual CPUs 40, enabling these CPUs to communicate directly over network 32. The CPUs 40 within multi-CPU server 36 are also configured to communicate with one another using a suitable fabric, e.g., a Quick-Path Interconnect (QPI) fabric. For communicating over network 32, however, each CPU 40 typically communicates with network adapter 44 over a respective direct link e.g., a PCIe link, and not via the QPI fabric.

In the disclosed embodiment, network adapter 44 comprises a plurality of PCIe interfaces 52 (in the present example two PCIe interfaces denoted 52A and 52B), one or more network ports 60, and processing circuitry 64 (also referred to as a processor). Each PCIe interface 52 is configured for communicating with a corresponding CPU 40 of multi-CPU server 36 over the corresponding direct links. Ports 60 are configured for communicating with network 32. PCIe interfaces 52 are also referred to as "bus interfaces."

Typically, each PCIe interface 52 of network adapter 44 is connected to its respective CPU 40 via a respective PCIe fabric 72. In the configuration FIG. 1, two separate PCIe fabrics 72A and 72B connect PCIe interfaces 52A and 52B to their respective CPUs. In the present example, PCIe fabric 72B is also used for connecting BMC 48 to PCIe interface 52A. In other words, PCIe interface 52A serves one of CPU 40, and also BMC 48. This connection is typically performed using a PCIe switch ("SW") in fabric 72B.

Network adapter 44 is typically used for (i) exchanging communication traffic between user applications running on server 36 and other entities (not shown) over network 32, and (ii) exchanging management packets between BMC 48 and console 28 over network 32. In an embodiment, processing circuitry 64 comprises one or more packet filters that filter and route each type of packet to the appropriate interface. For example, packet filters 68 typically distinguish between communication packets and management packets, and route each type of packet between ports 60 and the appropriate PCIe interface 52.

In the embodiment of FIG. 1, network adapter 44 is connected both to CPUs 40 and to BMC 48 using PCIe fabrics 72. In one embodiment, network adapter 44 communicates with BMC 48 using the PCIe signals. In another embodiment (not shown in FIG. 1), the PCIe interface that serves BMC 48 further comprises physical signals of a suitable sideband channel, such as the System Management Bus (SMBus). In the latter embodiment, network adapter 44 communicates with BMC using the sideband channel conveyed over the PCIe interface. This sort of implementation is also regarded herein as "communicating over a SMBus bus". In another embodiment, both SMBus and PCIe bus are used to connect the network adapter to the BMC, either at the same time or at different times as decided by the BMC. The latter implementation is also known as "Transition between mediums" or "Medium migration."

The system and server configurations of FIG. 1 are exemplary configurations that are shown purely for the sake of conceptual clarity. Any other suitable system and/or server configuration can be used in alternative embodiments. For example, server system 24 may comprise multiple multi-CPU servers 36. As another example, server system 24 may comprise multiple servers, any of which may comprise a multi-CPU server or a single-CPU server. Generally, not all of CPUs 40 in server system 24 need necessarily be connected directly to network adapter 44. In some embodiments, BMC 48 is not necessarily part of server 36. Depending on the network type, network adapter 44 may also be referred to as a Host Channel Adapter (HCA) or a Network Interface Controller (NIC), for example. Elements that are not necessary for understanding the principles of the disclosed techniques have been omitted from the figure for clarity.

In the exemplary configuration shown in FIG. 1, network adapter 44 is implemented as a board or Integrated Circuit (IC) that is separate from server 36. In alternative embodiments, however, network adapter 44 may be integrated with the hardware of server 36, for example.

The different elements of network adapter 44 may be implemented using any suitable hardware, such as in an Application-Specific Integrated Circuit (ASIC) or Field-Programmable Gate Array (FPGA). In some embodiments, some elements of network adapter 44 can be implemented using software, or using a combination of hardware and software elements.

In the embodiment of FIG. 1, server system 24 comprises a multi-CPU server 36 and a network adapter 44. Server 36 comprises a Baseboard Management Controller (BMC) 48. Multi-CPU server 36 comprises multiple Central Processing Units (CPUs) 40. The figure shows two CPUs denoted 40A and 40B, for the sake of clarity, but in various embodiments multi-CPU server 36 may comprise any suitable number of CPUs 40.

Additional aspects of NICs that connect hosts/servers and BMCs to a network are addressed in U.S. Patent Application Publications 2015/0172112, 2015/0215343, 2016/0248619 and 2016/0248620, which are assigned to the assignee of the present patent application and whose disclosures are incorporated herein by reference.

Exposing Only a Single Managed Entity Per Multi-CPU Server for Remote Management In some embodiments, every individual CPU 40 in multi-CPU server 36 supports a management protocol such as MCTP. (The embodiments described herein refer mainly to MCTP, but the disclosed techniques are applicable in a similar manner to any other suitable management protocol.) Theoretically, each CPU 40 can be managed individually by BMC 48 and remote console using 28 MCTP. In practice, however, such a fine granularity is often undesirable.

Moreover, the fact that network adapter 44 is connected via multiple PCIe interfaces to multiple MCTP-over-PCIe-capable devices is problematic and may cause various modeling and configuration problems. Typically, each CPU 40 of multi-CPU server 24 is an MCTP-over-PCIe-capable device. During MCTP enumeration, a processor serving as the "MCTP bus owner" enumerates the MCTP-over-PCIe-capable devices of server 36. If network adapter 44 were to respond to the bus owner's enumeration request via both PCIe interfaces 52A and 52B, BMC 48 and remote management console 28 would view network adapter 44 as multiple network adapters.

In order to avoid these and other problems, and to generally simplify the remote management task and make it more scalable, in some embodiments network adapter 44 reports only a single PCIe interface 52 (connected to a specific CPU 40 per server 36) to the MCTP bus owner as having support for MCTP.

Figure 2:
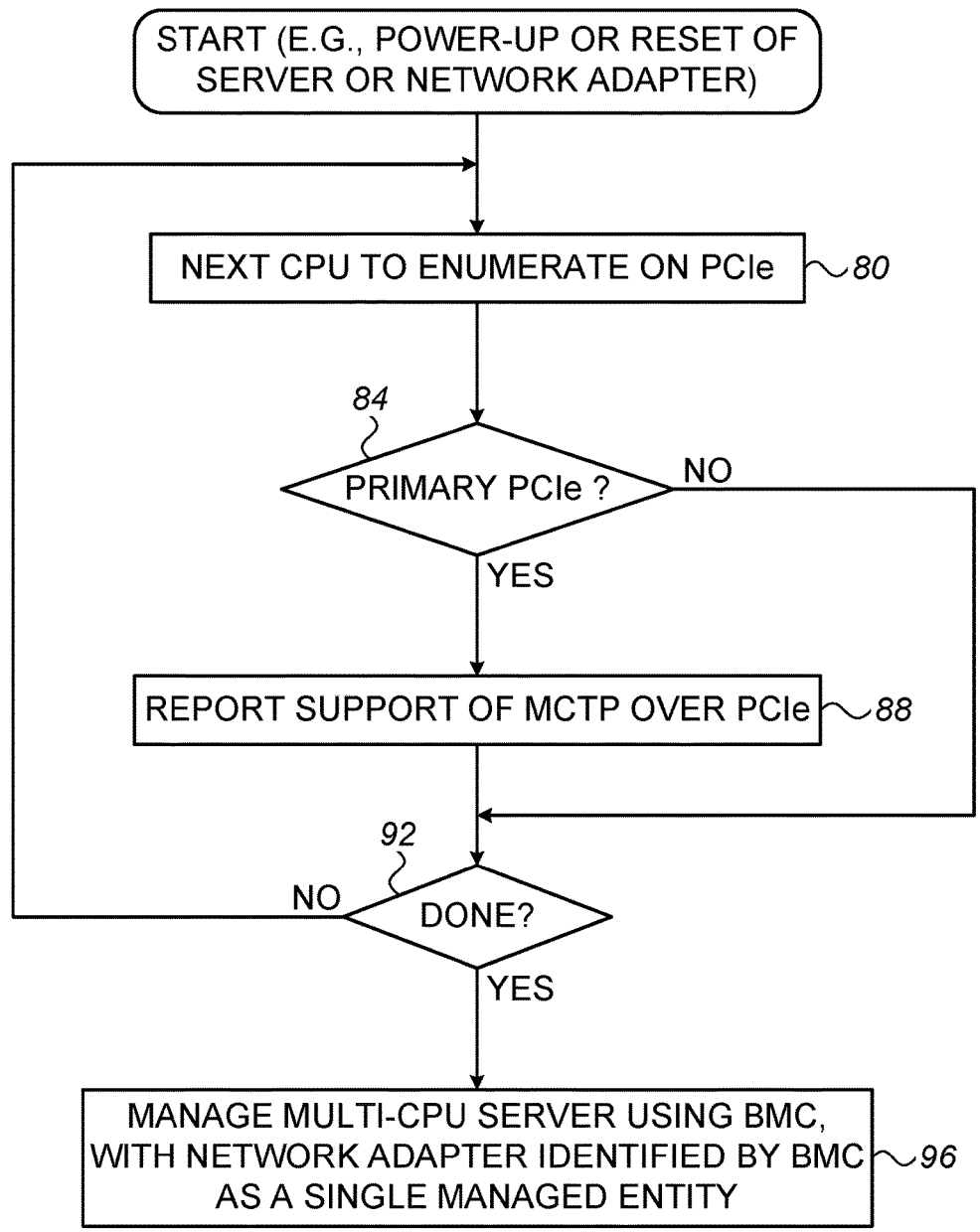
FIG. 2 is a flow chart that schematically illustrates a method for initializing remote management of a multi-CPU server, in accordance with an embodiment of the present invention.

FIG. 2 is a flow chart that schematically illustrates a method for initializing remote management of a given multi-CPU server 36 in server system 24, in accordance with an embodiment of the present invention. For clarity, the method description refers to a single multi-CPU server 36. When multiple multi-CPU servers 36 are to be managed, the method is typically repeated per server. The method of FIG. 2 may be carried out, for example, upon power-up or reset of server system 24, of a particular multi-CPU server 36, or of network adapter 44.

The method begins at an enumeration step 80, in which processing circuitry 64 is accessed by a CPU 40 connected to network Adapter 44, to enumerate PCIe interface 52 connected to this next CPU.

At a checking step 84, processing circuitry 64 checks whether the PCIe interface 52 of the currently-enumerating CPU 40 is defined as the primary PCIe interface of network adapter 44. The primary PCIe interface is typically defined as the PCIe interface that communicates on the network adapter's PCIe lane 0. Alternatively, any other suitable convention can be used.

If the PCIe interface of the currently-enumerating CPU is indeed the primary PCIe interface, processing circuitry 64 reports to BMC 48, via this PCIe interface, that network adapter 44 supports MCTP-over-PCIe, at a reporting step 88. This notification can be performed, for example, using PCIe Vendor Defined Messages (VDMs). If the currently-enumerating CPU 40 is not connected through the primary PCIe interface of network adapter 44, step 88 is skipped.

At a completion checking step 92, processing circuitry 64 checks whether all PCIe interfaces 52 on server 36 have been enumerated. If not, the method loops back to step 80 above. Once all PCIe interfaces 52 connected to network adapter 44 from server 36 are enumerated, the method proceeds to an on-going management step 96.

As can be seen from the description above, following the enumeration process of steps 80-92, BMC 48 is aware of only a single network adapter 44, connected to server 36 using a specific PCIe interface 52 and PCIe fabric 72, from among the multiple PCIe interfaces 52 and fabrics 72. Only this selected MCTP-over-PCIe interface 52 has been exposed to BMC 48 (by processing circuitry 64 of network adapter 44) as supporting MCTP. Although the other CPUs 40 of server 36 are also directly connected to the network adapter 44, this fact is hidden from BMC 48 by the network adapter.

Thus, at on-going management step 96, console 28 views and manages the entire multi-CPU server 36 as a single managed entity in accordance with MCTP. In other words, console 28 manages the entire multi-CPU server 36, including the multiple CPUs 40, by exchanging with BMC 48 management packets that all go through the single network adapter 44 over the selected PCIe interface supporting MCTP-over-PCIe, as reported at step 88.

In some cases the "single selected PCIe interface 52," for which support of MCTP is reported, comprises both PCIe signals and sideband-channel (e.g. SMBus) signals. Typically, the support of MCTP is reported over both types of signal of the same PCIe interface 52. In the context of the present patent application and in the claims, a PCIe interface having multiple bus types is also considered a "single bus interface." Thus, in the present context, "medium migration" between PCIe and SMBus vis-à-vis BMC 48 is regarded herein as remaining within the same bus interface.

Although the embodiments described herein mainly address management of multi-CPU servers (e.g., servers 36 of FIG. 1), the methods and systems described herein can also be used in other applications, such as for managing other types of multi-CPU or multi-PCIe-bus devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
one or more network ports configured to communicate with a communication network;
multiple bus interfaces, configured to communicate with multiple respective Central Processing Units (CPUs) that support a management protocol and belong to a multi-CPU device, and with a Baseboard Management Controller (BMC); and
a processor, configured to:
in response to a request to enumerate the bus interfaces that support the management protocol, report support of the management protocol over only a single bus interface, selected from among the multiple bus interfaces connecting the network adapter to the respective CPUs, even though one or more of the bus interfaces, other than the single selected bus interface, supports the management protocol; and
exchange management packets over the communication network between the BMC and a remote management computer, wherein the management packets manage the entire multi-CPU device but traverse only the single selected bus interface.

2. The network adapter according to claim 1, wherein, by reporting the support of the management protocol over only the single bus interface, the processor is configured to cause the BMC and the remote management computer to view the network adapter as a single managed entity of the management protocol on that bus interface.

3. The network adapter according to claim 1, wherein the multiple bus interfaces are configured to communicate with the multi-CPU device over a Peripheral Component Interconnect Express (PCIe) bus.

4. The network adapter according to claim 1, wherein the management protocol comprises a Management Component Transport Protocol (MCTP).

5. The network adapter according to claim 1, wherein the multi-CPU device comprises a multi-CPU server.

6. A method for remote management, comprising:
in a network adapter, communicating with a communication network via one or more ports, communicating with a BMC, and communicating via multiple bus interfaces with multiple respective Central Processing Units (CPUs) that support a management protocol and belong to a multi-CPU device;
in response to receiving in the network adapter a request to enumerate the bus interfaces that support the management protocol, reporting support of the management protocol over only a single bus interface, selected from among the multiple bus interfaces connecting the network adapter to the respective CPUs, even though one or more of the bus interfaces, other than the single selected bus interface, supports the management protocol; and
exchanging management packets over the communication network between the BMC and a remote management computer, wherein the management packets manage the entire multi-CPU device but traverse only the single selected bus interface.

7. The method according to claim 6, wherein reporting the support of the management protocol over only the single bus interface comprises causing the BMC and the remote management computer to view the network adapter as a single managed entity of the management protocol on that bus interface.

8. The method according to claim 6, wherein communicating via the multiple bus interfaces comprises communicating with the multi-CPU device over a Peripheral Component Interconnect Express (PCIe) bus.

9. The method according to claim 6, wherein the management protocol comprises a Management Component Transport Protocol (MCTP).

10. The method according to claim 6, wherein the multi-CPU device comprises a multi-CPU server.

11. A computer software product, the product comprising a tangible non-transitory computer-readable medium in which program instructions are stored, which instructions, when read by a processor of a network adapter, cause the processor to:
communicate with a communication network via one or more ports;
communicate with a BMC;
communicate via multiple bus interfaces with multiple respective Central Processing Units (CPUs) that support a management protocol and belong to a multi-CPU device;
in response to receiving a request to enumerate the bus interfaces that support the management protocol, report support of the management protocol over only a single bus interface, selected from among the multiple bus interfaces connecting the network adapter to the respective CPUs, even though one or more of the bus interfaces, other than the single selected bus interface, supports the management protocol; and
exchange management packets over the communication network between the BMC and a remote management computer, wherein the management packets manage the entire multi-CPU device but traverse only the single selected bus interface.

* * * * *